April 8, 1930.  I. H. ATHEY  1,753,735
VEHICLE WHEEL
Filed July 16, 1926   6 Sheets-Sheet 1
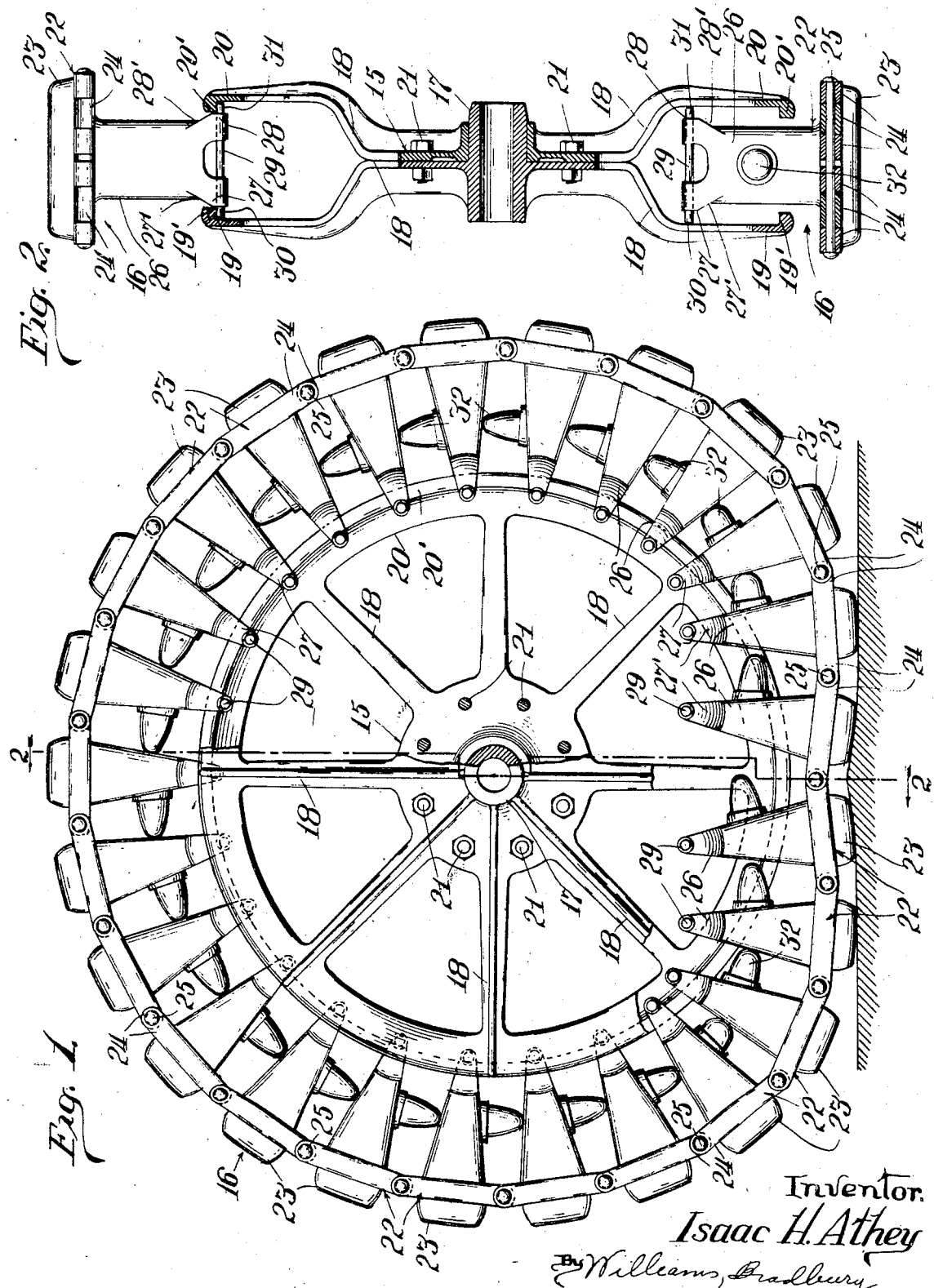
Inventor.
Isaac H. Athey
By Williams, Bradbury,
McCabe & Hinkle
Attorneys.

April 8, 1930.　　　　　I. H. ATHEY　　　　　1,753,735
VEHICLE WHEEL
Filed July 16, 1926　　　6 Sheets-Sheet 2
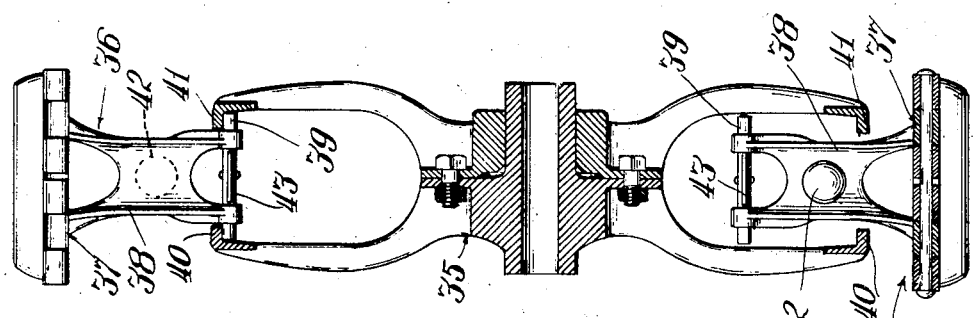
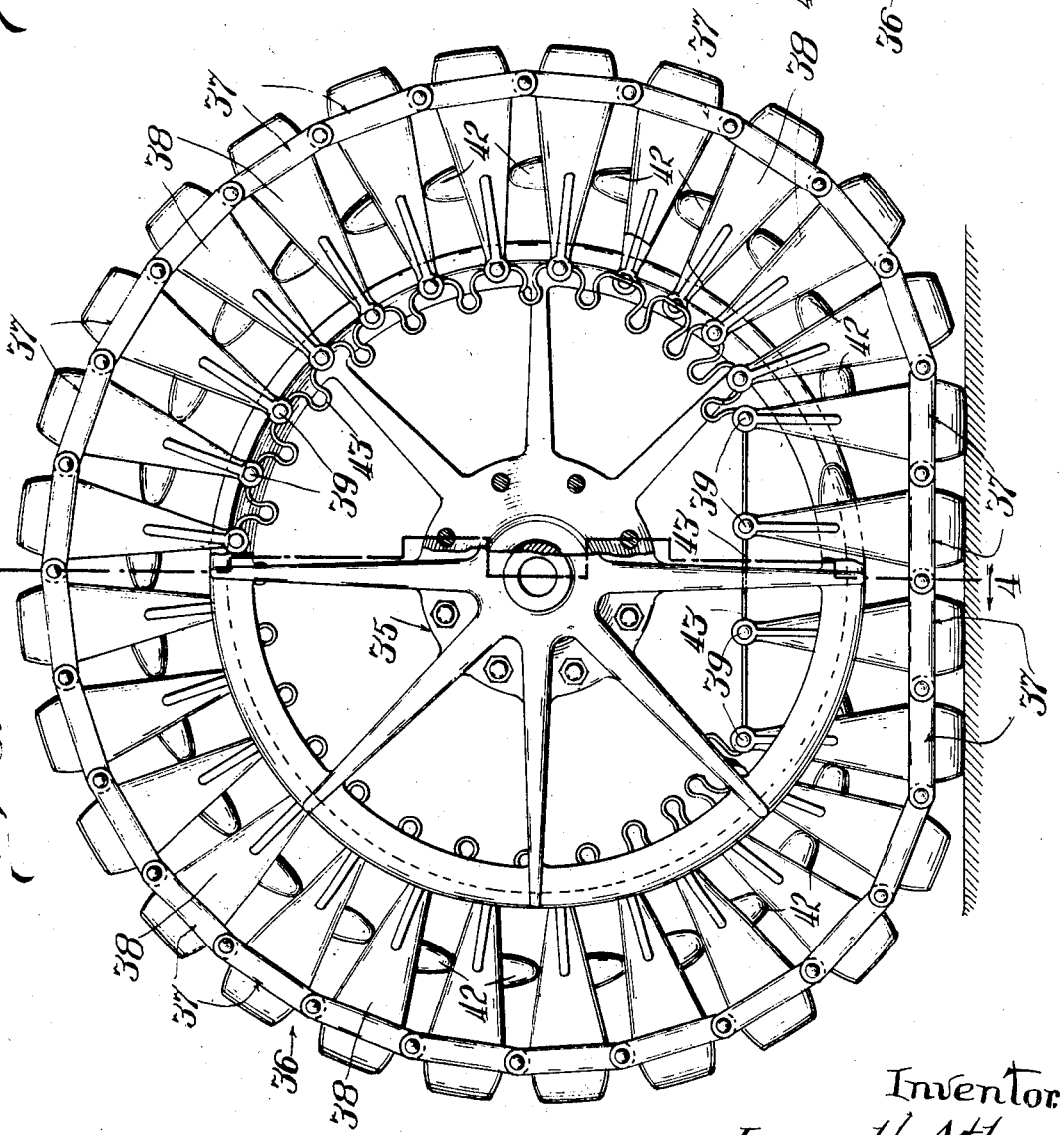
Inventor
Isaac H. Athey
By Williams, Bradbury,
McCaleb & Hinkle
Attorneys

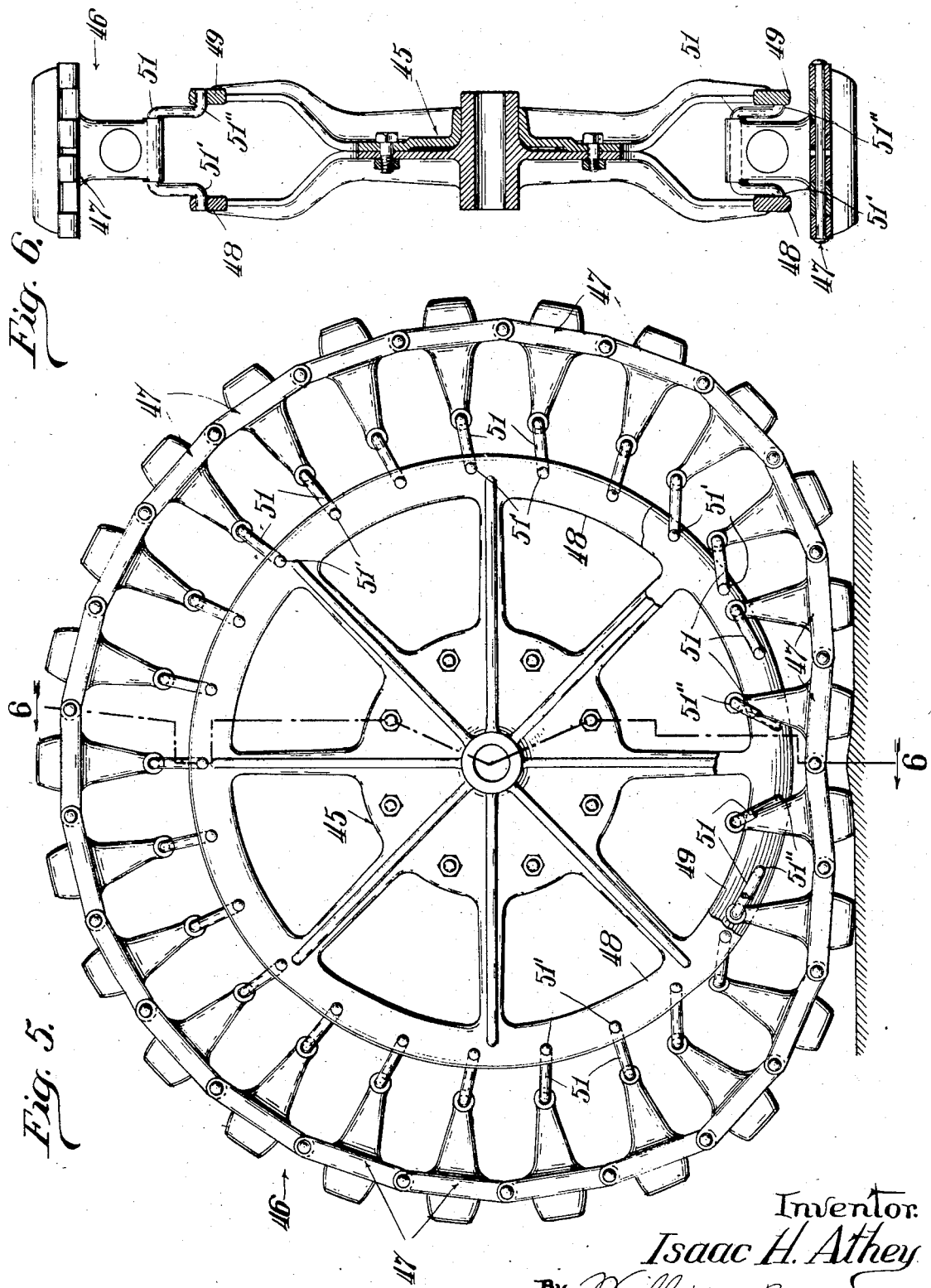

April 8, 1930.  I. H. ATHEY  1,753,735
VEHICLE WHEEL
Filed July 16, 1926  6 Sheets-Sheet 4
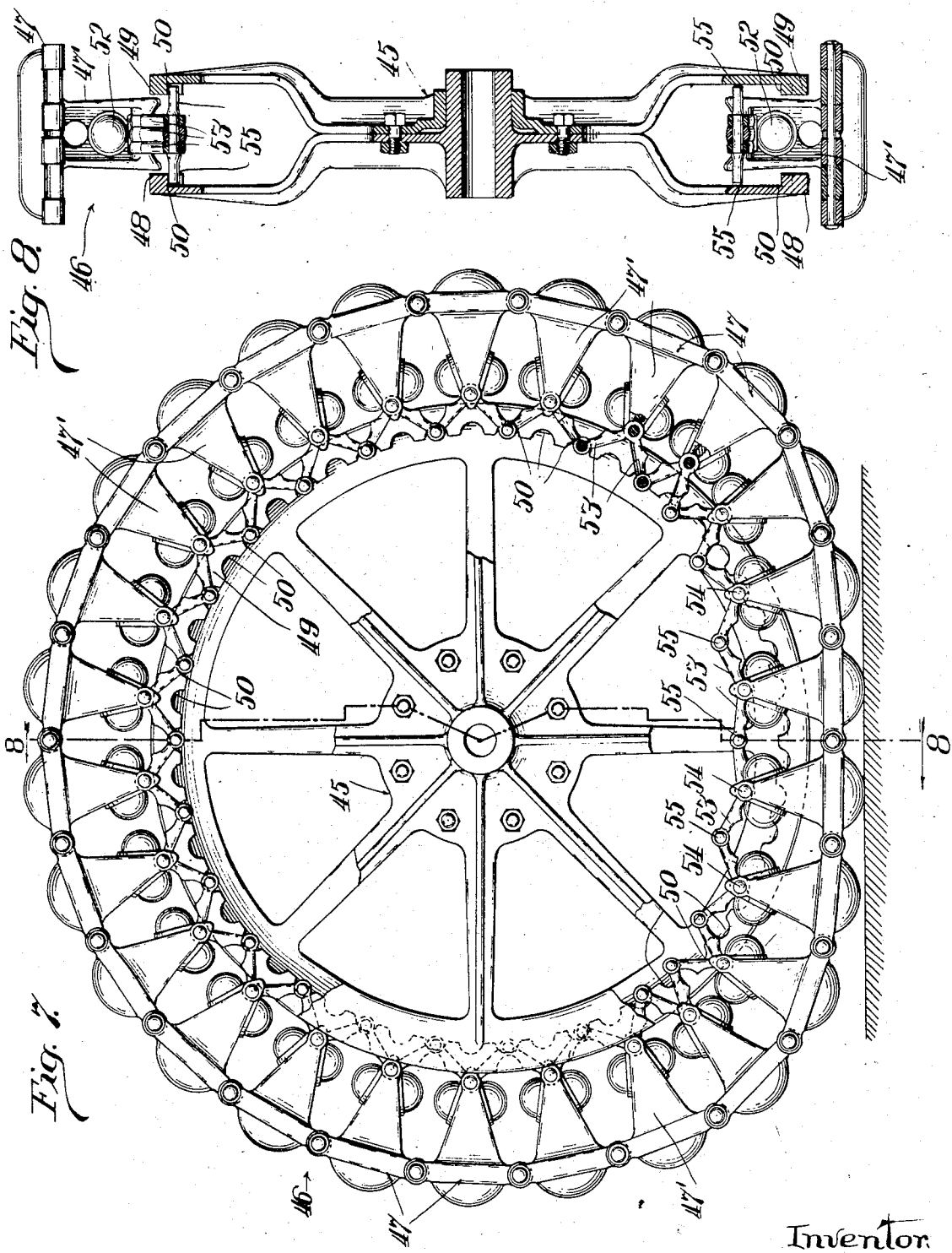
Inventor.
Isaac H. Athey
By Williams Bradbury
McCaleb & Hinkle
Attorneys.

April 8, 1930.  I. H. ATHEY  1,753,735
VEHICLE WHEEL
Filed July 16, 1926  6 Sheets-Sheet 5
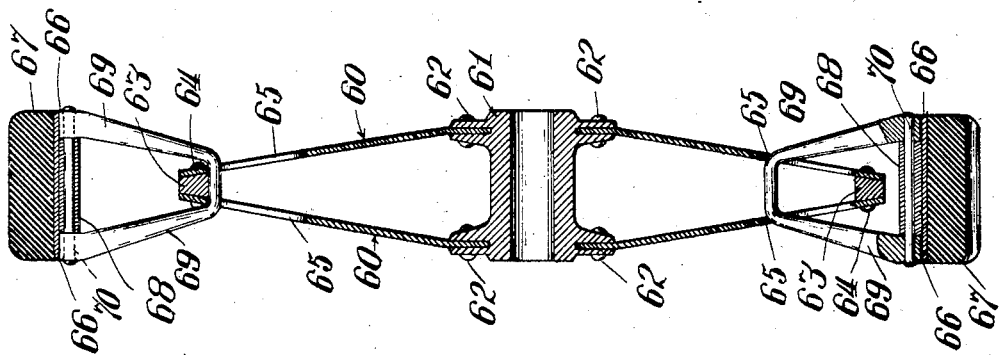
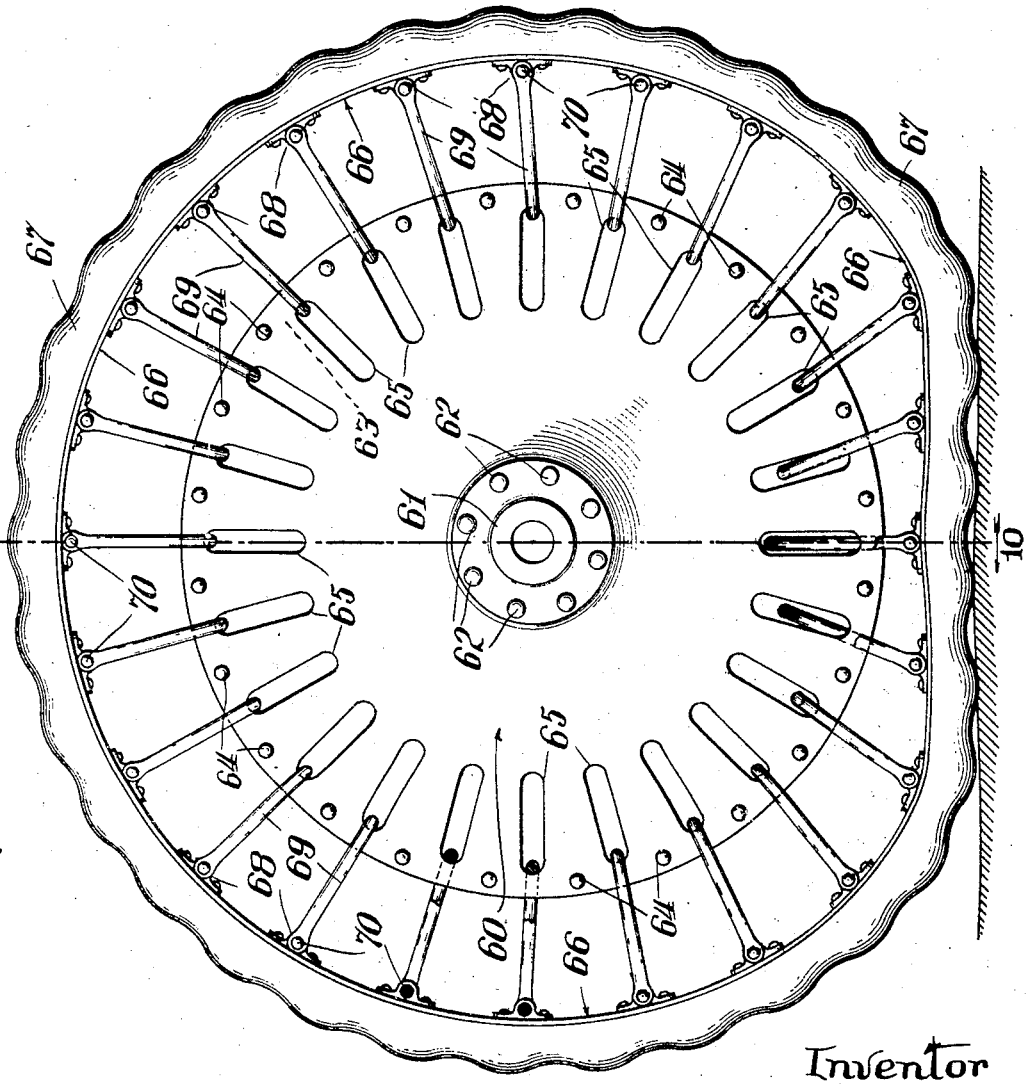
Inventor
Isaac H. Athey
By Williams, Bradbury,
McCaleb & Hinkle
Attorney.

April 8, 1930.  I. H. ATHEY  1,753,735
VEHICLE WHEEL
Filed July 16, 1926   6 Sheets-Sheet 6
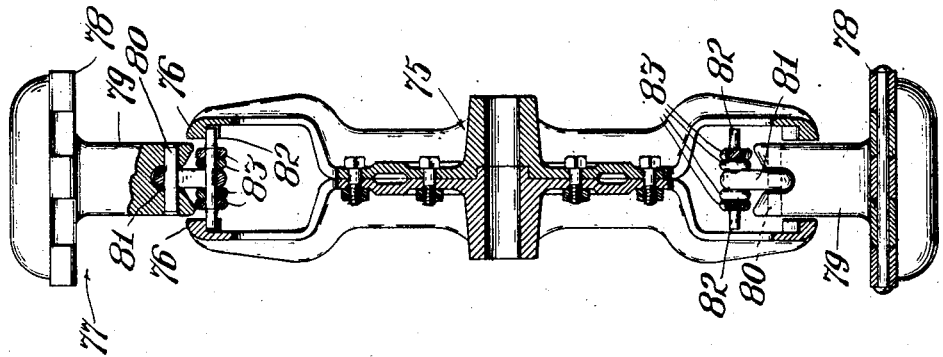
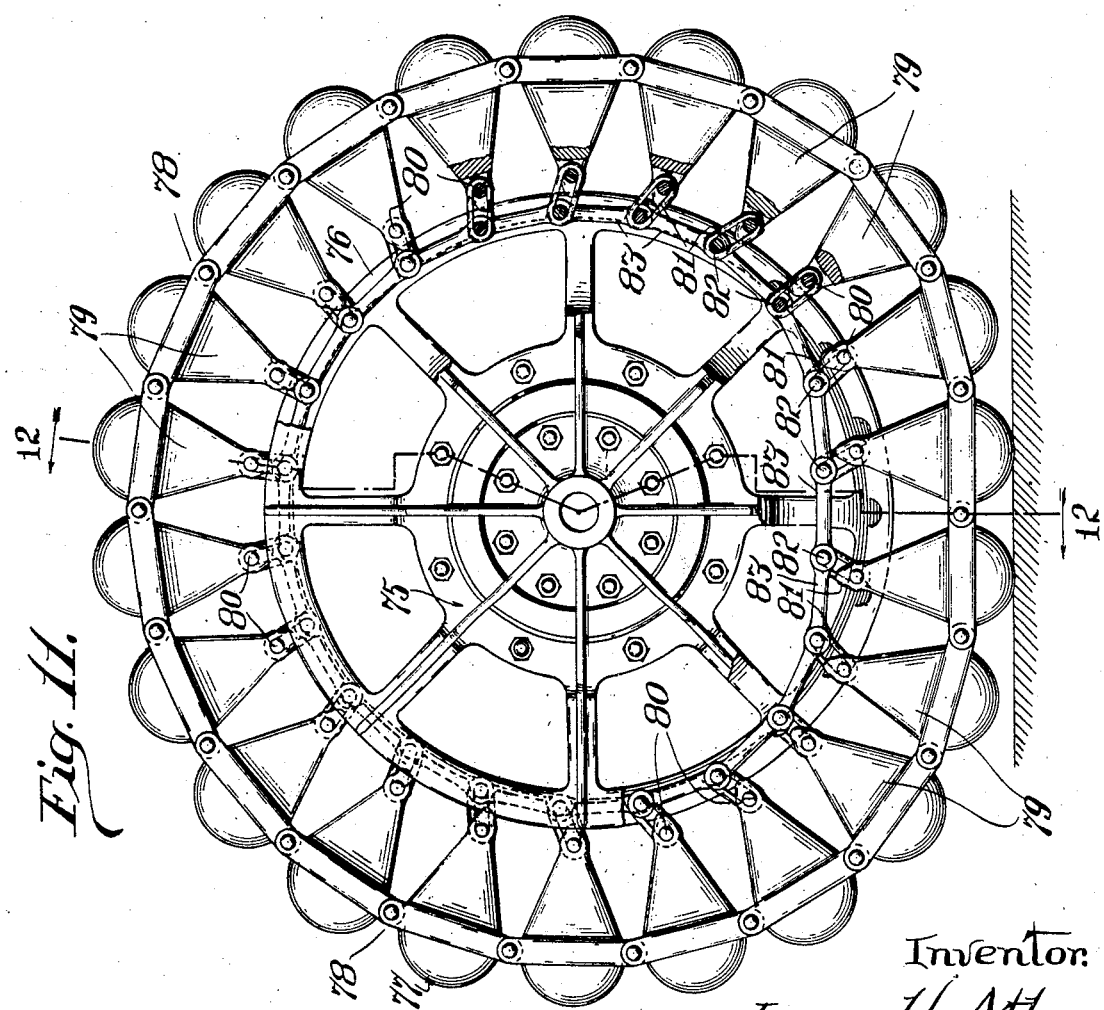
Inventor:
Isaac H. Athey
By Williams Bradbury
McCaleb & Hinkle
Attorneys.

Patented Apr. 8, 1930

1,753,735

UNITED STATES PATENT OFFICE

ISAAC H. ATHEY, OF CHICAGO, ILLINOIS

VEHICLE WHEEL

Application filed July 16, 1926. Serial No. 122,769.

My invention relates to vehicle wheels.

More particularly the invention is concerned with the provision of a vehicle wheel which will afford a relatively large area in contact with the ground.

One of the objects of my invention is to provide an improved vehicle wheel.

Another object is to provide a wheel capable of carrying heavy loads over soft ground.

Another object is to provide a wheel of a novel track-laying type.

Another object is to provide a track-laying wheel which dispenses with the necessity of providing at least two load-wheels for each track.

Another object is to provide a wheel of relatively small compass capable of presenting a large flat supporting surface on the ground.

Another object is to provide a track-laying wheel which in general resembles the conventional circular vehicle wheel.

Another object is to provide a wheel adapted for vehicles of either the drawn or self-propelled types.

Another object is to provide a track-laying wheel capable of operation at high speeds.

Another object is to provide a wheel which will require a minimum of power to overcome road obstructions and unevenness.

Another object is to provide a wheel which will cushion and absorb shocks and jolts caused by uneven ground and road obstructions.

Another object is to provide a track-laying wheel of simple, inexpensive and light construction.

Other objects and advantages will hereinafter appear.

In general my improved wheel comprises a rigid inner wheel which takes the load from the vehicle axle, and an outer flexible tread band which suspends the inner wheel to receive the load therefrom and is capable of providing a relatively flat road engaging surface as distinguished from the curved surface of ordinary vehicle wheels.

The accompanying drawings show some of the embodiments my invention may assume for application to vehicles of the drawn and self-propelled types.

In the drawings Fig. 1 is a side elevation and partial section of a wheel adapted for vehicles of the drawn type;

Fig. 2 is a section on the line 2—2 of Fig. 1;

Fig. 3 is a side elevation and partial section of a modified drawn-vehicle type of wheel provided with means for trussing and stiffening the track which supports the load;

Fig. 4 is a section on the line 4—4 of Fig. 3;

Fig. 5 is a side elevation and partial section of a wheel adapted for either drawn or self-propelled vehicles;

Fig. 6 is a section on the line 6—6 of Fig. 5;

Fig. 7 is a side elevation and partial section of a modified wheel for drawn and self-propelled vehicles provided with means for trussing or stiffening the track supporting the load;

Fig. 8 is a section on the line 8—8 of Fig. 7;

Fig. 9 is a side elevation and partial section of another modified wheel for drawn or self-propelled vehicles;

Fig. 10 is a section on the line 10—10 of Fig. 9;

Fig. 11 is a side elevation and partial section of a wheel showing a further modification of the trussing or stiffening arrangement, and Fig. 12 is a section on the line 12—12 of Fig. 11.

Figs. 1 and 2 show a rigid inner load-supporting wheel 15 and a flexible outer band 16 for suspending the load carrying wheel and continuously providing a relatively large and flat surface in contact with the ground as the vehicle moves along. Inner wheel 15 has a central hub 17 adapted to be mounted in the usual way upon the end of the vehicle axle. Spokes 18, which are transversely forked or bifurcated as shown most clearly in Fig. 2, radiate from hub 17, and parallel continuous outer rims 19 and 20 inter-connect the similarly disposed arms of the spokes. Rims 19 and 20 are provided with inwardly projecting annular flanges 19' and 20' respectively, whereby the inner wheel is suspended from the outer band as will be hereinafter explained. In order to facilitate manufacture, the inner wheel may be fabricated from two sections of cast or otherwise formed metal, each section constituting an integral structure constituting one of the rims and corresponding half of the spokes. These two sections may be securely fastened together by bolts 21, or other suitable means.

Outer flexible band 16 comprises a series of tread shoes 22, each having a tread portion 23 and spaced hinge lugs 24 projecting from opposite sides. The hinge lugs of adjacent shoes overlap or interlock and hinge pins or pintles 25 passing through aligned holes in the overlapped lugs of adjacent shoes interconnect all of the shoes into a flexible endless band. Each shoe has a tapered inwardly projecting suspension arm 26, preferably, although not necessarily, formed integral with its shoe tread portion. The inner end or head of each arm 26 is provided with transversely projecting lugs or bosses 27 and 28 having outwardly tapering surfaces 27' and 28' which merge inwardly with the respective sides of the corresponding arm. A suspension link in the form of a pin 29 is carried by the head of each suspension arm 26. The ends of each pin project laterally beyond each side of the head of arm 26 to form suspension lugs 30 and 31. These lugs 30 and 31 lie between the arms of the spokes of the inner wheel and, at the proper time engage and are held by the parallel annular flanges 19' and 20' of the inner wheel rims. Each arm 26 carries a buffer 32, preferably made of rubber or spring metal to absorb shocks, interposed to engage the arm of an adjacent shoe and thereby limit the extent to which the arms and shoes can fold together.

The number and pitch (i. e., length between hinge centers) of the shoes and the disposition of their suspension lugs should be such that a true circle defined by the rim contacting surfaces of the suspension lugs is somewhat smaller than the contacting surfaces of annular flanges 19' and 20' of the rigid inner wheel. In other words, the annular suspension surface of the inner wheel (flanges 19'—20') should be of larger diameter than that of a circle describing all of the suspension surfaces of the outer band (lugs 30—31). The necessity for this requirement will be obvious because if all of the shoe suspension links should be in simultaneous contact with the rigid inner wheel flanges the outer band also would be, in effect, rigid and there could be no flattening action.

The operation of the wheel is as follows:

Inner wheel 15, being rigid, always maintains its circular shape, and the share of the load borne by its end of the vehicle axle is imparted thereto through hub 17. Outer band 16, because it is flexible, tends to elongate horizontally and flatten vertically. When the vehicle is at rest on a flat surface, the tendency to elongate is limited by the engagement of the annular flanges 19' and 20' with the ends of the suspension links of those shoes which lie in the region of a horizontal plane through the axis of the inner wheel. Likewise, throughout the region above the horizontal plane through the axis and, depending upon the load, in some of the regions below that plane the rigid annular flanges 19' and 20' and the shoe suspension links limit the flattening tendency. In other words, throughout a portion of the wheel periphery, radially outward movements of the shoes of the flexible wheel relative to the inner wheel are limited by the flanges of the rigid inner wheel. But in the vicinity of the bottom the relation of the shoe suspension links to the inner wheel rim flanges is such that radial movement can take place therebetween. Consequently, under the assumed conditions, the upper portion of the outer flexible band is caused to assume a circular arc concentric with the inner rigid wheel. But because the suspension lug circle is smaller than the rigid wheel flanges the bottom of the outer band is free to and actually does flatten under load, presenting a relatively large and flat supporting surface to the ground. The load borne by the inner wheel is transferred to the suspension links of the outer band shoes in varying proportions—from a maximum in a substantially vertical plane through the axis to a minimum in the vicinity of a horizontal plane through the axis. The load is transmitted from shoe to shoe through the interposed buffers 32 downwardly to the shoes in contact with the ground. The buffers also serve to limit the curvature of the outer band resulting from the folding together of its shoes, and serves to insure the maintenance of equal spacing of the shoe suspension links about the peripheries of the inner wheel rim flanges. In its flattened condition the outer band forms in effect a rigid arch supported by the shoes in contact with the ground and suspending the rigid wheel therein.

The extent to which the outer flexible band can flatten, and consequently the maximum number of shoes that can be in simultaneous contact with the ground, is dependent upon two factors. One of these factors is the size or length of the buffers. The longer the buffers (and consequently the greater the permissible minimum separation between the shoe suspension arms) the less can be the flattening and the fewer the number of shoes that can be on the ground at one time. Conversely, within the limits of any particular design, the smaller the buffers (and consequently the less the permissible minimum separation between shoe suspension arms) the more the shoes can fold together and the greater the number that can be in contact with the ground at one time. The other factor is the difference between the diameters of the rim flanges and the circle described by the contacting surfaces of the shoe suspension links. In other words, the larger the diameter of the rim flanges relative to the diameter of the circle describing the suspension link contact surfaces, the more the flexible band can flatten and the greater the effective supporting surface on the ground. Thus by a proper balancing of these two factors a wheel can be designed to provide any desired amount of flattening. Of course, for any design it will be undesirable ordinarily to make the difference in diameter so great or the buffers so small that the bottom of the flexible band can flatten enough to permit the lower portion of the inner wheel rim flanges to strike the tread shoes, or, if the shoes are narrower than the distance between the flanges, to permit the rim of the inner wheel to strike the ground.

Under a condition of rest, therefore, the lower portion of the outer flexible band is flat on the ground while the shoes above those on the ground form a rigid arch from which the inner wheel and the load are suspended. For a particular wheel the amount of flattening will depend upon the extent to which the weight of the load compresses the buffers.

When the vehicle is drawn along the ground the axis of the inner wheel tends to move forwardly relative to the outer band. Consequently in a horizontal direction the advance portions of the rim flanges of the inner wheel tend to move outwardly relative to the shoe suspension links, while the trailing or rearward portions of the forwardly moving rims tend to move inwardly relative to the shoe suspension links. Thus, when forward movement starts, there will be a forward shifting of the flattened surface of the outer wheel relative to the vertical plane through the axis of the inner wheel. Gradually, therefore, the load bearing axle will be shifted in the direction of travel relative to the outer wheel until a condition of equilibrium for any load and rate of travel is reached. Consequently, a load can be started from a condition of rest with less jolt than with an ordinary band, because the outer wheel serves as a cushion to absorb gradually the shock of starting.

When the wheel meets an obstruction, for example a stone, the advance shoes when they strike the stone can move radially inward because the inner wheel flanges cannot oppose the inward movement of the shoe suspension links. The result, because the length of the periphery of the outer flexible band is constant, is that the position of the flattened portion of the outer band is shifted relatively forwardly or toward the obstruction. Also, the flattened portion is no longer horizontal but slopes upwardly toward the obstruction. Therefore, the center of the inner wheel is moved upwardly and forwardly relative to the outer band, just as though it was being moved up an inclined plane, although, of course, the movement is accomplished wholly by the suspending action between the rigid wheel rim flanges and the shoe suspension links. Thus the raising of the load over an obstruction takes place partly by an inclined plane effect within the wheel itself, only a portion of the rise being due to a bodily lift of the entire wheel and load over the obstruction. Furthermore, the load continues to move even though the outer band may stop momentarily when it strikes the obstruction, and in consequence the momentum of the load helps to overcome the obstruction. Consequently, the force required to overcome obstructions is lessened and, in addition, the shock is largely absorbed by the flexing of the outer band.

In passing off of the obstruction, the action is the reverse of that just described, so that the band simulates the effect of an inclined plane down which the load is moved from the obstruction. The result is that the wheel does not abruptly drop from the obstruction but moves gradually therefrom and the jolt is lessened.

The inclined bosses 27 and 28 on the shoe suspension arms insure the proper seating and distribution of load between the tread shoes and the parallel inner wheel rim flanges 19' and 20'. As shown most clearly at the top of Fig. 2, the distance between the facing ends of rim flanges 19' and 20' is approximately equal to the distance between the outer faces of bosses 27 and 28 so that when the suspension links and bosses approach each other the inclined surfaces on the bosses center the shoes and, when the suspension links are in engagement with the flanges, the shoes are held in central position against any appreciable amount of lateral movement. Thus the outer band is placed and maintained in proper load-equalizing position relative to the two flanges of the inner wheel. However, when the links and inner wheel flanges are radially separated by the flattening of the outer band, the facing ends of the flanges do not contact with the shoe suspension arms, as clearly shown at the bottom of Fig. 2. Consequently the in and out movements of the shoes, as the wheel revolves, do not create much friction with the inner wheel and the wear and resistance to movement are reduced.

In the wheel just described the approach or coming together of adjacent shoe suspension arms is limited by the interposed buffers. Between adjacent shoes, however, there is nothing to prevent separation between their suspension arms and consequently adjacent shoes may pivot about the interconnecting hinge so that the hinge will move inwardly. This movement will result in the outer band assuming a more or less concave form as it passes over road obstructions and uneven ground. Where the roadway is firm this capability of becoming concave may be of advantage in absorbing shocks due to unevenness and obstructions, but where the roadway is relatively soft, like sand or mud, then this capability of becoming concave may be a disadvantage.

Figs. 3 and 4 show a wheel generally similar to that shown in Figs. 1 and 2, but provided with a trussing structure to prevent the outer band from becoming excessively concave. This wheel comprises a rigid inner wheel 35 and a flexible outer band 36. The outer band is composed of tread shoes 37 which are hinged together to form a flexible band, and each shoe has a tapering rigid suspension arm 38 carrying a suspension link 39 projecting transversely from opposite sides of its inner head. These suspension links are adapted to lie within and engage the parallel annular rim flanges 40 and 41 of the rigid inner wheel. Each shoe is likewise provided with a buffer 42 which lies between its suspension arm and the arm of an adjacent shoe. The construction, relation and operation of these elements are precisely the same as the corresponding elements of the wheel heretofore described.

In order to limit the separation of the adjacent suspension arms and thereby prevent their shoes from pivoting inwardly about the inter-connecting hinge, a band is provided for interconnecting the inner ends of the suspension arms which is at regular intervals, securely anchored to each truss arm head forming a truss link 43, are made flexible or otherwise collapsible so that they may fold and not interefere with the coming together or approach of the suspension arms, although, when extended, they do prevent the separation of the arms beyond a predetermined amount. Thus the shoes in the flattened portion of the outer band cannot pivot about their inter-connecting hinges in such a way that the hinges can move inwardly and consequently the outer band is prevented from becoming concave and is held substantially flat.

Inasmuch as friction is the only force acting to prevent relative rotation between the inner wheel and outer band, the structures heretofore described, although admirable for drawn vehicles, are not particularly suitable for self-propelled vehicles. In other words, because the inner wheel and outer band may freely turn relative to each other, only a limited amount of traction can be obtained by rotating the inner wheel from a source of power, such as an engine carried by the vehicle.

Figs. 5 and 6 show a wheel adapted for either drawn or self-propelled vehicles. This wheel comprises a rigid inner load supporting band 45 and a flexible outer wheel 46. As before, the outer band is composed of a series of pivotally inter-connected tread shoes 47 and the inner rigid wheel has parallel outer rims 48 and 49. The head of each shoe suspension arm pivotally carries a suspension link 51 which is of a substantially U-shape. The inner ends 51' and 51" of these links are bent laterally outward and respectively journalled in the inner wheel rims 48 and 49. In general this structure operates in the same way as those previously described, but inasmuch as the rotation of the inner wheel relative to the outer band is limited by the length of the suspension links, which are pivotally anchored to both wheel and band, the inner wheel may be used as a driven wheel and good traction may be obtained.

Figs. 7 and 8 show a modified construction of traction wheel which I consider the preferred form. This wheel comprises a rigid inner load supporting wheel 45 and an outer flexible suspension band 46 composed of pivotally inter-connected shoes 47. The inner wheel has parallel annular suspension rim flanges 48 and 49 which are provided with axially aligned notches or sockets 50 in their inner faces. Each shoe has an inwardly projecting rigid suspension arm 47', each of which in the embodiment shown carries a section 52 of an interposed buffer. The head of each arm 47' carries a set of three truss links 53 pivotally attached thereto by truss link pins 54. Two of the links 53 at each pin extend in one direction while one link extends in the opposite direction and the two links from one shoe and the single link from an adjacent shoe are pivotally inter-connected by a suspension pin 55. These suspension pins project beyond the links they inter-connect and lie within the peripheries of the rigid wheel flanges so that they can seat in the corresponding sockets therein. Thus the inner wheel suspension links comprise the truss links and their inter-connecting suspension pins. Since the suspension pins seat in the sockets of the inner wheel rim flanges, except throughout the flattened portion of the outer band where the suspension pins lie inside of the inner peripheries of the flanges as shown at the bottom of Fig. 7, the relative rotation between the inner and outer wheels is limited. The truss links also serve to limit the separation between adjacent tread shoe suspension arms although they readily fold inwardly to permit the arms to approach each other so that the outer band can assume the necessary circular form throughout its upper arch. Thus the inward or concave flexure of the outer flexible band may be restricted or entirely eliminated. Due to the fact that suspension pins 55, when restrained in the sockets of the inner wheel rim flanges and thereby prevented from further outward movements, do not permit the pivoted links between adjacent shoes to entirely straighten out, the inward and proper folding of the links is assured when the links approach and leave the wheel flattening position.

Inasmuch as a true circle describing the contacting surfaces of all of the suspension pins 55 is of smaller diameter than the diameters of the inner wheel flanges, the outer band will gain slightly upon the inner wheel and each suspension pin will seat in a socket at the trailing end or rear of the flattened portion different from the socket it left at the advancing or forward end of the flattened portion. Thus, for example, as shown in the drawings, if the outer flexible band is composed of twenty-six inter-connected shoes and there are fifty-three sets of sockets in the inner wheel flanges, then each suspension pin, upon re-entering the curvature at the rear of the flattened portion, will seat in the socket immediately ahead of the socket in which it was seated when it entered the flattened portion. Throughout the region where the suspension pins are seated in the sockets, however, there is no relative movement between the inner and outer wheels and consequently the inner band can drive the outer wheel. The number of shoes composing the outer band, the number of sockets in the inner wheel and the relative diameters of the contacting portions of the wheel and outer band will determine the maximum amount the outer band can flatten so that, by proper design, the desired conditions can be obtained.

Figs. 9 and 10 show another modified form of traction wheel adapted for use either on drawn or self-propelled vehicles. In this modified form the rigid inner wheel consists of two metal discs 60 anchored to a central hub 61 in any suitable manner, such as by rivets 62. Discs 60 converge from the center outwardly and along their outer edges are rigidly anchored to a suspension ring 63 by rivets 64 or other appropriate means. Discs 60 are provided with axially aligned slots 65 equally spaced about and adjacent their outer edges.

The flexible outer band comprises a continuous spring band 66 having a corrugated tread surface 67 of rubber or other suitable flexible material secured thereto. A series of inwardly projecting hinge lugs 68 corresponding in number to the number of slots 65 in each disc are secured to bands 66. A somewhat U-shaped suspension link 69 has its outer separated ends pivotally connected to each hinge lug 68 by a pivot pin 70 and forms a loop lying in the corresponding pair of slots 65 of the rigid inner wheel. In this construction, the inner wheel is suspended by links 65 from the outer band and maintains the upper arch of the outer band in substantially a circle concentric therewith, just as in the constructions heretofore described. The slots permit radially inward movements of links 69 so that the outer band is free to flatten on its road engaging side and, since the links are retained therein, there can be only a limited, if any, relative rotation between the wheel and outer band.

Figs. 11 and 12 show another modified arrangement for suspending the inner wheel from the outer band and for limiting the inward or concave deflection of the outer band relative to the ground. This construction includes a rigid inner wheel 75 having inturned annular suspension rim flanges 76 and a flexible outer band 77 composed of pivotally connected tread shoes 78, each shoe having an inwardly projecting rigid suspension arm 79. The head of each suspension arm 79 carries a cross pin 80 which lies within the slot of and holds a link 81. Links 81 loosely carry transversely projecting suspension pins 82 which are adapted to engage the annular rim flanges 76 of the inner wheel and thereby suspend the inner wheel from the outer band in the manner previously described. Truss links 83, extending in pairs in opposite directions from each suspension pin 82 and pivotally connected thereto limit the separation between shoe suspension arms 77 and thereby limit the inward deflection of the flattened portion of the outer band when the same engages road obstructions or uneven ground.

Having thus described and illustrated several embodiments of my invention, what I claim and desire to secure by United States Letters Patent is as follows:

1. A vehicle wheel comprising a rigid inner load supporting wheel provided with an annular suspension surface, and a flexible outer tread band having a tread surface lying outside of the inner wheel and having suspension links which lie and move inside of the suspension surface of the inner wheel and cooperate therewith to suspend the inner wheel from a portion only of the outer wheel.

2. A vehicle wheel comprising a rigid inner load supporting wheel having annularly arranged sockets, a flexible endless outer tread band, and suspension links carried by the tread band to seat in said sockets and suspend the inner wheel from the tread band.

3. A vehicle wheel comprising a rigid inner load supporting wheel, a series of tread shoes pivotally inter-connected to form a substantially circular flexible tread band outside of the inner wheel, each shoe having a suspension link loosely engaging the inner wheel, and a series of buffers arranged between the shoes to limit the amount the shoes can fold together.

4. A vehicle wheel comprising a series of tread shoes pivotally inter-connected to form an endless band, each shoe having an inwardly projecting rigid suspension arm carrying a suspension link at its inner end, a rigid inner load supporting wheel having an annular suspension surface of greater diameter than the diameter of a circle describing all of the shoe suspension links and positioned to be engaged by the links whereby the inner wheel is suspended from the flexible band, and means for limiting the pivotal movement between adjacent shoes.

5. A vehicle wheel comprising a flexible endless tread band, a rigid load supporting wheel within the band, a series of rigid suspension members projecting inwardly from the band, and a connection between each suspension member and the load supporting wheel, said connections holding part of the band on the arc of a circle concentric with the load supporting wheel and permitting some of the suspension members to move within the circumferential bounds of the inner wheel.

6. A vehicle wheel comprising a flexible endless tread band, a rigid load supporting wheel within the band, a plurality of suspension members projecting inwardly from the band and connected with the load supporting wheel at points adjacent the periphery thereof, the relative lengths of the peripheries of the band and the inner wheel being such that only part of the suspension members can be under tension at one time.

7. A vehicle wheel comprising a single rigid load supporting wheel, a flexible endless band encompassing the load supporting wheel and spaced apart therefrom, and a series of suspension members cooperatively connecting said wheel at points adjacent its periphery to the band, said suspension members coacting with the load supporting wheel on an effective circumference less than that of the load supporting wheel.

8. A vehicle wheel comprising a rigid inner wheel for supporting a load, an endless flexible outer tread band, and suspension members carried by the tread band for engaging with and suspending the inner wheel, said suspension members having their inner wheel engaging ends confined within the circumferential bounds of the inner wheel and free to move toward the axis of the wheel.

9. A vehicle wheel comprising a rigid inner load supporting wheel, an endless flexible outer tread band, and rigid suspension members carried by the flexible tread band for engaging with and suspending the inner wheel, said suspension members having their inner wheel engaging ends confined within the circumferential bounds of the inner wheel and free to move toward the axis of the wheel.

10. A vehicle wheel comprising a rigid inner load supporting wheel, an endless flexible outer tread band, suspension members carried by the tread band and extending radially toward the axis of the inner wheel and having their inner ends within the circumferential bounds of the inner wheel, said inner ends of said suspension members being secured to the inner wheel by lost motion connections so as to suspend the inner wheel therefrom and to permit the suspension members to move radially toward the axis of the inner wheel.

11. A vehicle wheel comprising a flexible endless tread band, a rigid load supporting wheel within said band, said load supporting wheel having its outer portions formed of two spaced apart rim members, a plurality of suspension members projecting inwardly from the band, and means associated with the suspension members disposed between the rim members of the inner wheel for engaging the rim members to limit the outward movement of the suspension members and thus suspend the inner wheel within the flexible band.

12. A vehicle wheel comprising a single rigid load supporting wheel having spaced apart rim portions with inwardly extending flanges at the peripheries thereof, a flexible endless band encompassing the load supporting wheel and spaced apart therefrom, a series of suspension members carried by the band, and means carried by the suspension members disposed between the rims of the inner wheel and engageable with the flanges to limit the outward movement of the suspension members from the wheel, thereby suspending the inner wheel within the band.

13. A vehicle wheel comprising a flexible endless tread band, a rigid load supporting wheel within the band having a plurality of sockets formed at the rim thereof, a plurality of suspension members projecting inwardly from the band, and means carried by the suspension members and engaging with the sockets to suspend the inner wheel from the band.

14. A vehicle wheel comprising a flexible endless tread band, a rigid load supporting wheel within the band formed with a pair of substantially parallel rim portions, a plurality of suspension members projecting inwardly from the band, a plurality of sockets formed on the rims of the inner wheel, and means carried by the suspension members extending between the rim portions and movable radially toward the axis of the wheel to permit the band to flatten and to move into engagement with the sockets to suspend the inner wheel from the band.

In witness whereof, I hereunto subscribe my name this 13th day of July, 1926.

ISAAC H. ATHEY.